United States Patent
Yamaguchi et al.

(10) Patent No.: US 8,029,929 B2
(45) Date of Patent: Oct. 4, 2011

(54) POSITIVE ELECTRODE ACTIVE SUBSTANCE FOR LITHIUM CELL

(75) Inventors: Munetoshi Yamaguchi, Hiroshima (JP); Shinya Kagei, Hiroshima (JP); Yoshimi Hata, Hiroshima (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 1031 days.

(21) Appl. No.: 11/630,259

(22) PCT Filed: Jun. 20, 2005

(86) PCT No.: PCT/JP2005/011240
§ 371 (c)(1),
(2), (4) Date: Dec. 21, 2006

(87) PCT Pub. No.: WO2005/124900
PCT Pub. Date: Dec. 29, 2005

(65) Prior Publication Data
US 2008/0032198 A1    Feb. 7, 2008

(30) Foreign Application Priority Data

Jun. 22, 2004 (JP) ................ 2004-184186
Oct. 6, 2004 (JP) ................ 2004-293382
Dec. 10, 2004 (JP) ................ 2004-358887

(51) Int. Cl.
*H01M 4/50* (2010.01)

(52) U.S. Cl. .................................... 429/224
(58) Field of Classification Search ........... 429/224
See application file for complete search history.

(56) References Cited

U.S. PATENT DOCUMENTS

| 4,246,253 A | 1/1981 | Hunter |
| 4,604,336 A * | 8/1986 | Nardi ............... 429/224 |
| 5,658,693 A * | 8/1997 | Thackeray et al. ......... 429/224 |

FOREIGN PATENT DOCUMENTS

| JP | 58-34414 | 7/1983 |
| JP | 61-17424 | 1/1986 |
| JP | 01-231270 | 9/1989 |
| JP | 03-080120 | 4/1991 |
| JP | 03-122968 | 5/1991 |
| JP | 03-254065 | 11/1991 |
| JP | 11-329424 | 11/1999 |
| JP | 2001-273900 | 10/2001 |
| JP | 2005-038839 | 2/2005 |

OTHER PUBLICATIONS

Thackeray, M.M, "Understanding $MnO_2$ for Lithium Batteries," *Battery Technology Unit* (1991).

\* cited by examiner

*Primary Examiner* — Karie O'Neill Apicella
(74) *Attorney, Agent, or Firm* — The Webb Law Firm

(57) ABSTRACT

A positive electrode active material for a lithium battery is provided which offers high-temperature storage property and battery properties and comprises manganese dioxide having a crystal structure that exhibits an X-ray diffraction pattern in which peaks having a peak intensity ratio of not less than 0.05 with respect to the peak at $2\theta=37.3°\pm0.5°$ are present at positions of $2\theta=18.2°\pm0.5°$, $19.5°\pm0.5°$, $28.6°\pm0.5°$, $56.6°\pm0.5°$, $59.1°\pm0.5°$, and $65.1°\pm0.5°$, or further at $2\theta=22.0°\pm1.0°$, the X-ray diffraction pattern being obtained using a powder X-ray diffraction device (XRD) that uses CuKα1 rays.

9 Claims, 6 Drawing Sheets

POSITIVE ELECTRODE ACTIVE SUBSTANCE FOR LITHIUM CELL

CLAIM OF PRIORITY

This application claims priority under 35 USC 371 to International Application No. PCT/JP2005/011240, filed on Jun. 20, 2005, which claims priority to Japanese Patent Application No. 2004-184186, filed on Jun. 22, 2004, Japanese Patent Application No. 2004-293382, filed Oct. 6, 2004 and Japanese Patent Application No. 2004-358887, filed Dec. 10, 2004.

TECHNICAL FIELD

The present invention relates to a positive electrode active material for a lithium battery comprising manganese dioxide.

BACKGROUND ART

Manganese dioxide, fluorocarbon, and the like are typical of positive electrode active materials for lithium primary batteries and have already become practical. In particular, manganese dioxide has the advantages of good storage property and being inexpensive. Much effort has thus been made to use manganese dioxide as a positive electrode active material (see Patent Documents 1 and 2).

The following are also known: a manganese dioxide formed by treating, with an acid, an orthorhombic lithium-manganese composite oxide obtained by low-temperature firing at 350° C. to 450° C. (Patent Document 3), a manganese dioxide obtained by treating spinel type $LiMn_2O_4$ (Patent Document 4) with an acid, and a manganese dioxide obtained by treating $LiMn_2O_4$ with an acid and then firing the treated material (Non-Patent Document 1).

Furthermore, Patent Document 5 discloses manganese dioxide obtained by firing λ type manganese dioxide at a temperature of 250° C. to 400° C. Patent Document 6 discloses a manganese dioxide obtained by firing λ type manganese dioxide at a temperature of 150° C. to 450° C. Patent Document 7 discloses a composite oxide obtained by treating a spinel type composite oxide with an acid and then thermally treating the treated material at a temperature of 200° C. to 400° C.

Patent Document 1: Japanese Patent Application Laid-Open No. 3-80120 (claims and others)
Patent Document 2: Japanese Patent Application Laid-Open No. 3-254065 (claims and others)
Patent Document 3: Japanese Patent Application Laid-Open No. 3-122968 (claims and p. 2 and 3 and others)
Patent Document 4: Japanese Patent Application Publication No. 58-34414 (p. 1 and 2 and others)
Patent Document 5: Japanese Patent Application Laid-Open No. 61-17424 (p. 3 and others)
Patent Document 6: Japanese Patent Application Laid-Open No. 1-231270 (claims and others)
Patent Document 7: Japanese Patent Application Laid-Open No. 2001-273900 (claims and others)
Non-Patent Document 1: Thackeray, "Understanding MnO2 for lithium batteries" (material for the lecture at IBA Inuyama Meeting, Oct. 28 and 29, 1991), pp. 33, 35, 36

DISCLOSURE OF THE INVENTION

Problems to be Solved by the Invention

There has been a problem that if any of the conventional manganese dioxides is used as a positive electrode active material, when a battery is left in a high temperature environment for a long time, its battery properties may be degraded. It has been pointed out that, in particular, in the environment where temperature reaches 80° C. or higher, the positive electrode active material dissolves in an organic electrolytic solution and deposits on a separator to increase the internal resistance of the battery, resulting in the degradation of the battery properties.

In view of this conventional problem, the present invention is intended to provide a positive electrode active material for a lithium battery that offers an excellent high-temperature storage property.

Means for Solving the Problems

The present invention provides a positive electrode active material for a lithium battery which comprises manganese dioxide having a crystal structure that exhibits an X-ray diffraction pattern in which peaks having a peak intensity ratio of not less than with respect to 0.05 to a peak at $2\theta=37.3°\pm0.5°$ are present at positions of $2\theta=18.2°\pm0.5°$, $19.5°\pm0.5°$, $28.6°\pm0.5°$, $56.6°\pm0.5°$, $59.1°\pm0.5°$, and $65.1°\pm0.5°$, the X-ray diffraction pattern being obtained using a powder X-ray diffraction device (hereinafter referred to as "XRD") that uses $CuK\alpha1$ rays (in other words, these peaks have a peak intensity of not less than 0.05 if the peak intensity at $2\theta=37.3°\pm0.5°$ is assumed to be 1. In this case, if not less than two peaks are present within the range of $2\theta=37.3°\pm0.5°$, the peak of the larger peak intensity is defined to be a reference. This also applies to the present invention). In the present invention, the peak intensity means the height of the peak, and the peak intensity ratio means the ratio of the peak height.

The present invention also provides a positive electrode active material for a lithium battery which comprises manganese dioxide having a crystal structure that exhibits an X-ray diffraction pattern in which peaks having a peak intensity ratio of not less than 0.05 with respect to a peak at $2\theta=37.3°\pm0.5°$ are present at positions of $2\theta=18.2°\pm0.5°$, $19.5°\pm0.5°$, $22.0°\pm1.0°$, $28.6°\pm0.5°$, $56.6°\pm0.5°$, $59.1°\pm0.5°$, and $65.1°\pm0.5°$, the X-ray diffraction pattern being obtained using a powder X-ray diffraction device (hereinafter referred to as "XRD") that uses $CuK\alpha1$ rays.

The above description does not mean that the presence of only the above six or seven peaks is associated with the manganese dioxide having the crystal structure exhibiting the peaks of the predetermined peak intensity at the above positions according to the present invention. Instead, the above description means that provided that not less than the six or seven peaks are present, other peaks may be present at positions other than those described above.

Both manganese dioxides described above, if a lithium battery is constructed by using the manganese dioxide as a positive electrode active material, are provided with a property having both the characteristic that positive electrode active material is stable with respect to an electrolytic solution and unlikely to generate a gas and the characteristic of being electrochemically active when discharging. That is to say, the positive electrode active material for a lithium battery according to the present invention provides a battery offers an excellent high-temperature storage property, in particular, excellent storage property even in a high-temperature environment where temperature reaches 80° C. or higher, and further exhibits excellent battery properties such as a continuance discharge property. Accordingly, the present invention is particularly suitable for use in a lithium battery used in an environment where temperature reaches 80° C. or higher.

The term "lithium battery" as used in the present invention includes all batteries containing lithium or lithium ions, for example, a lithium primary battery, a lithium secondary battery, a lithium ion secondary battery, and a lithium polymer battery.

Even if the upper and lower limit values of a numerical range specified according to the present invention deviate slightly from the specified numerical range, they are included in the scope of the present invention as long as it provides the same effects as when within the limits of the numerical values in question.

In the present invention, the peak intensity means the height of the peak (cps).

Moreover, in the present invention, the phrase "comprising" in "positive electrode active material for a lithium battery comprising a predetermined manganese dioxide" means that the present invention includes not only the positive electrode active material comprising only the predetermined manganese dioxide but also positive electrode active materials containing other manganese dioxides as long as it provides the excellent effects of the predetermined manganese dioxide. The concentration of the predetermined manganese dioxide is not strictly specified, However, the present invention allows the content of the predetermined manganese dioxide not less than 50%, preferably not less than 70%, particularly preferably not less than 80%, and more preferably not less than 90%.

Further, in the present invention, the description "X to Y" (X and Y are arbitrary numbers) means "not less than X and not more than Y" unless otherwise specified.

BEST MODE FOR CARRYING OUT THE INVENTION

Figure 1:
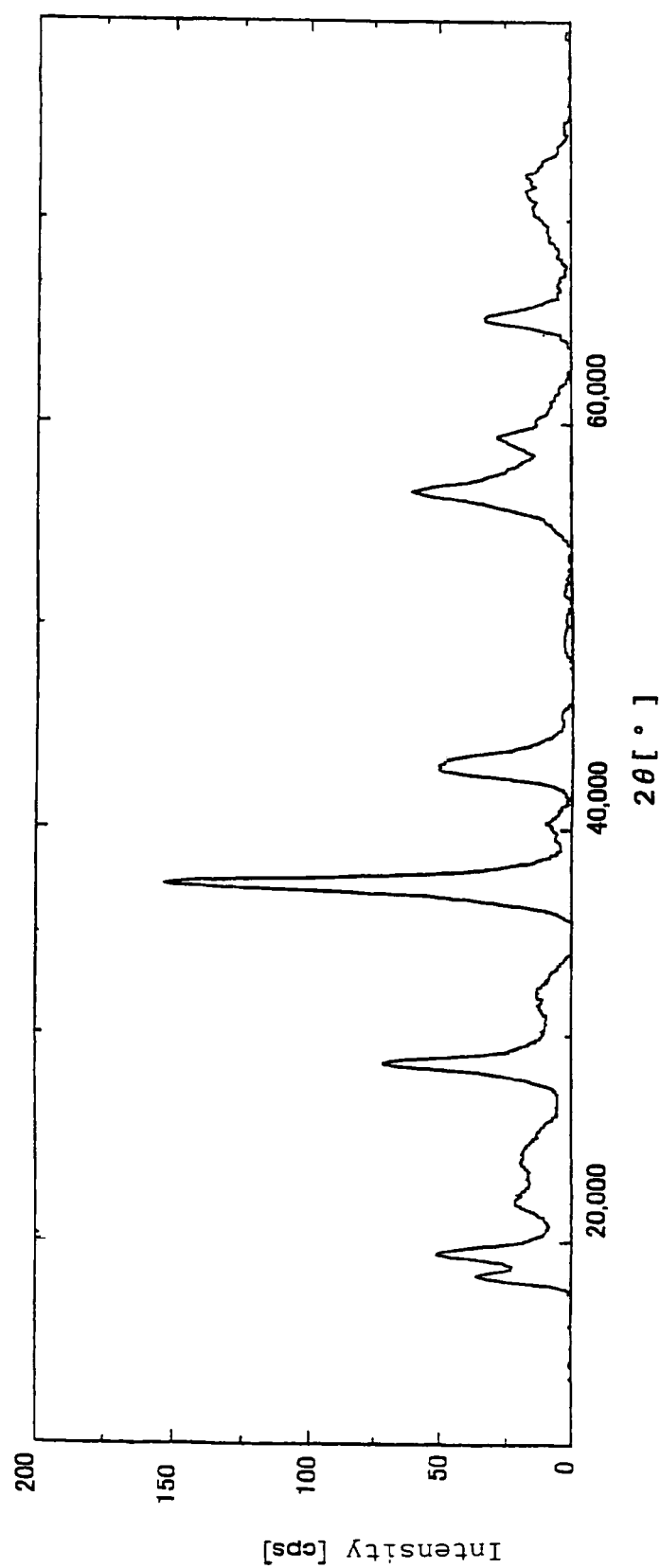
FIG. 1 is an X-ray diffraction pattern (chart) obtained in Example 2.

Embodiments of the present invention will be described, however, the present invention is not limited to the embodiments below.

A first embodiment of the present invention provides a positive electrode active material for a lithium battery which comprises manganese dioxide having a crystal structure that exhibits an X-ray diffraction pattern in which peaks having a peak intensity ratio of not less than 0.05 with respect to a peak (reference peak) at $2\theta=37.3°\pm0.5°$ are present at positions of $2\theta=18.2°\pm0.5°$, $19.5°\pm0.5°$, $28.6°\pm0.5°$, $56.6°\pm0.5°$, $59.1°\pm0.5°$, and $65.1°\pm0.5°$, the X-ray diffraction pattern being obtained using a powder X-ray diffraction device (XRD) that uses CuKα1 rays.

A second embodiment of the present invention provides a positive electrode active material for a lithium battery which comprises manganese dioxide having a crystal structure that exhibits an X-ray diffraction pattern in which peaks having a peak intensity ratio of not less than 0.05 with respect to a peak (reference peak) at $2\theta=37.3°\pm0.5°$ are present at positions of $2\theta=18.2°\pm0.5°$, $19.5°\pm0.5°$, $22.0°\pm1.0°$, $28.6°\pm0.5°$, $56.6°\pm0.5°$, $59.1°\pm0.5°$, and $65.1°\pm0.5°$, the X-ray diffraction pattern being obtained using a powder X-ray diffraction device (XRD) that uses CuKα1 rays.

The first embodiment does not mean that only the above six peaks appear in the X-ray diffraction pattern. The second embodiment does not mean that only the above seven peaks appear in the X-ray diffraction pattern. It means that, as long as the above six or seven peaks appear in the X-ray diffraction pattern, other peaks may appear at the respective positions.

Further, in both cases, if at least two peaks are present within the range of $2\theta=37.3°\pm0.5°$, the peak of the larger peak intensity is used as a reference.

The peak located at $2\theta=18.2°\pm0.5°$ is characteristic of a spinel type lithium manganese oxide. The peak located at $2\theta=19.5°\pm0.5°$ is characteristic of a $\lambda$-$MnO_2$. Further, the peak located at $2\theta=22.0°\pm1.0°$ is characteristic of a $\gamma$-$MnO_2$. The peaks located at $2\theta=28.6°\pm0.5°$, $56.6°\pm0.5°$, $59.1°\pm0.5°$, and $65.1°\pm0.5°$ are characteristic of a $\beta$-$MnO_2$.

Thus, neither of the manganese dioxides of the first and second embodiments is a manganese dioxide having a crystal structure of only one of the $\gamma$, $\beta$, and $\lambda$ phases. Further, neither of the manganese dioxides of the first and second embodiments is a manganese dioxide having a 2-phase coexisting crystal structure consisting of two of these phases. These manganese dioxides each have a crystal structure in which at least spinel type lithium manganese oxide, $\gamma$-$MnO_2$, and $\beta$-$MnO_2$ or these plus $\lambda$-$MnO_2$ coexist. These manganese dioxides are hereinafter referred to as "spinel-$\beta$-$\lambda$(-$\gamma$) phase coexisting manganese dioxide".

"$\pm0.5°$" in the expression "$2\theta=18.2°\pm0.5°$", indicating a peak position, does not indicate a measurement error but means including of peaks appearing at positions within the range of $\pm0.50$. With a difference in lithium content, acid treatment conditions, firing conditions, or the like, peak positions are shifted even with the crystal structure of the same formation due to axis lengths or the like being varied. The wording "$\pm0.5°$" therefore includes peak positions within the range of $18.2°\pm0.5°$ since the same effect as $18.2°$ can be expected. For certainty, $\pm0.3°$ is more preferable than $\pm0.5°$, and $\pm0.2°$ is much more preferable. The above mentioned also applies to other peaks.

Further, only for $2\theta=22.0°\pm1.0°$, the range is specified as $\pm1.0°$ because peaks near $2\theta=22.0°$ are broad peaks characteristically covering a wide range. In this case, for certainty, $\pm0.9°$ is more preferable than $\pm1.0°$, and $\pm0.8°$ is much more preferable.

Furthermore, the "spinel-$\beta$-$\lambda$(-$\gamma$) phase coexisting manganese dioxide" may include positive electrode active materials containing manganese dioxides of other crystal structures as long as these materials can produce the excellent effects of the "spinel-$\beta$-$\lambda$(-$\gamma$) phase coexisting manganese dioxide". The content of the "spinel-$\beta$-$\lambda$(-$\gamma$) phase coexisting manganese dioxide" may be not less than 50%, preferably not less than 70%, particularly preferably not less than 80%, and more preferably not less than 90%.

More preferable formations of the positive electrode active materials of the first and second embodiments will be described below.

A positive electrode active material is more preferably comprising manganese dioxide having a crystal structure such that the peak present at a position of 28.6°±0.5° has a peak intensity ratio of not less than 0.3 with respect to the peak at 2θ=37.3°±0.5°.

Further, a positive electrode active material is more preferably comprising manganese dioxide having a crystal structure such that the peak intensity ratio of the peak present at the position of 28.6°±0.5° with respect to the peak at 2θ=37.3°±0.5° is not less than 0.3, and the full width at half maximum of the peak is not more than 1.0°, particularly 0.2° to 1.0°.

Furthermore, a positive electrode active material is more preferably comprising manganese dioxide having a crystal structure such that the angular difference between the peak present at a position of 56.6°±0.5° and the peak present at a position of 59.1°±0.5° is not less than 2°.

Moreover, a positive electrode active material is more preferably comprising manganese dioxide having a crystal structure such that the peak intensity ratio of the peak present at a position of 65.1°±0.5° with respect to the peak at 2θ=37.3°±0.5° is not less than 0.10, and the full width at half maximum of the peak is not more than 1.0°, particularly 0.2° to 1.0°.

The above expression "full width at half maximum of the peak" means peak width (angle) at half height of peak.

Among the above manganese dioxides, a particularly preferable example is manganese dioxide having a crystal structure that exhibits an X-ray diffraction pattern, measured with a powder X-ray diffraction device (XRD) using CuK1 rays, wherein the peak intensity ratio of the peak present at a position of 2θ=19.5°±0.5° with respect to the peak at 2θ=37.3°±0.5° is 0.05 to 0.3 before discharge, on the other hand, the peak intensity ratio is not less than 1.0 after discharge down to a cut voltage of 1.0 V at a constant resistance of 2.5 kΩ at 20° C.

The manganese dioxides having the above crystal structure were tested for battery properties. The test results showed that some of the manganese dioxides exhibiting excellent battery properties were subjected to phase changes by discharge to have special crystal structures (which exhibit peaks of high intensities near 19° with XRD) at the end of the discharge (as is the case with, for example, Example 2 described later).

Further, in the positive electrode active material of the first and second embodiments, the amount of lithium element in the manganese dioxide is preferably not less than 1.0%, particularly preferably 0.3 to 1.0%, more particularly 0.3 to 0.8%, and much more particularly 0.3 to 0.6%. In this case, the amount of the lithium element is a value obtained by an ICP analyzer.

(Manufacture Method)

A method for manufacturing a positive electrode active material according to the present invention is not particularly limited provided that it can manufacture a spinel-β-λ(-γ) phase coexisting manganese dioxide. An example of the preferred manufacture method will be described below, however, the present invention is not limited to this.

An example of the preferred manufacture method will now be roughly described. A manganese dioxide can be manufactured by a manufacture method characterized by mixing a material manganese dioxide, a lithium salt compound, a boron compound, and a magnesium compound, firing the mixture at 700° C. to 950° C. (first firing) to obtain a boron-containing lithium-manganese composite oxide (hereinafter referred to as a "boron-containing LMO"), washing the boron-containing LMO with an acid, adjusting the particle size of the boron-containing LMO as required, and firing the boron-containing LMO at 200° C. to 330° C. (second firing) to obtain a spinel-β-λ(-γ) phase coexisting manganese dioxide.

The method will be sequentially described below in detail.

It is found and disclosed that by setting a second firing temperature at a value on a low temperature side of range of 200° C. to 330° C., it is possible to manufacture a manganese dioxide comprising a crystal structure where a spinel type lithium manganese oxide, γ-$MnO_2$, β-$MnO_2$, and λ-$MnO_2$ coexist, and by setting the second firing temperature at a value on a high temperature side of range of 200° C. to 330° C., it is possible to manufacture a manganese dioxide comprising a crystal structure where a spinel type lithium manganese oxide, γ-$MnO_2$, and β-$MnO_2$ coexist. However, these do not mean that the second firing temperature is the only factor distinguishing these manganese dioxides from each other.

<Materials>

Manganese dioxides as materials may be obtained by an electrolytic method or chemical synthesis or may be natural. Further, these materials may be heated or phosphorous or the like may be added to them. Among these materials, an electrolytic manganese dioxide is particularly preferable.

The formations of the manganese dioxides that can be used as materials are described in p. 2 of Japanese Patent Application Laid-Open No. 61-17424. Although not confirmed, for example, a manganese dioxide of pyrolusite is a β type manganese dioxide consisting mainly of a β phase. A manganese dioxide of nustite is a γ type manganese dioxide consisting mainly of a γ phase. A manganese dioxide of Hollandite is an α type manganese dioxide consisting mainly of an α phase. The λ type manganese dioxide consisting of the λ phase is obtained by treating $LiMn_2O_4$ with an acid as described in U.S. Pat. No. 4,246,253. A δ type manganese dioxide consisting of a δ phase is generated by chemically reducing potassium permanganate. The electrolytic manganese dioxide is the γ type manganese dioxide consisting mainly of the γ phase.

The electrolytic manganese dioxide, preferred as a manganese dioxide material, may be obtained by, for example, electrolyzing a conventionally known electrolytic solution comprising manganese sulfate and a sulfuric acid solution. Specifically, the concentrations of manganese and sulfuric acid in the electrolytic solution are generally 20 g/L to 50 g/L and 30 g/L to 80 g/L, respectively. Further, for electrodes, titanium or the like may be used for an anode. Carbon or the like may be used for a cathode. Conventionally known electrolysis conditions may also be used. Electrolysis has only to be executed, for example, at a bath temperature of 90° C. to 100° C. and a current density of 50 A/$m^2$ to 100 A/$m^2$.

The lithium salt compound is not particularly limited but may include lithium carbonate, lithium hydroxide, lithium sulfate and the like.

The boron compound is not particularly limited but may include boric acid, lithium borate, lithium tetraborate and the like.

The amount of the boron compound is preferably such that, when synthesizing a lithium-manganese composite oxide, the synthesis contains 0.001 to 2.0 mass percent of boron, particularly 0.05 to 0.3 mass percent of boron.

A magnesium compound is not particularly limited but may include an oxide, hydroxide, or carbonate of magnesium.

The amount of magnesium compound to be added is preferably such that Mg element substitution becomes 0.05 to 0.5 mol % with respect to Mn.

<First Firing>

The above materials are mixed together and the mixture is fired at 700° C. to 900° C. for 5 hours to 20 hours to manufacture boron-containing LMO.

However, firing temperature is not always limited to 700° C. to 900° C. Firing at 550° C. to 950° C. has possibility to result in a boron-containing LMO equivalent to that obtained by firing at 700° C. to 900° C. Firing at 550° C. to 900° C. results in a lithium-manganese composite oxide consisting mainly of spinel, whereby lithium can be easily removed by the subsequent acid washing. Moreover, although depending on the particle size of the material, by synthesizing a lithium-manganese composite oxide containing 0.001 to 2.0 mass percent of boron with the firing temperature of 550° C. to 900° C., it is possible to finally obtain a manganese dioxide having specific surface area of 1 $m^2/g$ to 8 $m^2/g$. On the other hand, firing at a temperature higher than 900° C. decomposes the material, resulting in impurities such as $MN_3O_4$. Firing at a temperature lower than 550° C. results in impurities such as $LiMn_2 Oz$ (Z>4), further tends to degrade the battery properties and high-temperature storage property.

The boron-containing LMO obtained by the firing preferably consists mainly of spinel. The lithium-manganese composite oxide may have other formations than the spinel structure, for example, a layered structure. However, the structure mainly consisting of spinel has the advantage of easily removing lithium from the lithium-manganese composite oxide by of the subsequent acid washing.

Further, the boron-containing LMO preferably contains a boron compound as a water-soluble salt present with the lithium-manganese composite oxide as in the chemical formula $LiMn_2O_4$ $Li_2B_4O_7$. A method for manufacturing the boron-containing LMO can be executed on the basis of Examples 1 to 10 described below. "." in the chemical formula means additional compounds and $LiMn_2O_4$ and $Li_2B_4O_7$ are not dissolved as solid solution. The boron element does not constitute a spinel, and furthermore, the compound is in a state different from a mixed state.

Thus having the compound contain boron at the stage of firing the lithium-manganese composite oxide enables a reduction in the specific surface area of the lithium-manganese composite oxide and manganese dioxide. This does not mean that the boron only serves to reduce the specific surface area. Although not experimentally confirmed, the boron can be considered to be a causative substance that enables the spinel-$\beta$-$\lambda$(-$\gamma$) phase coexisting manganese dioxide to be finally manufactured.

The content of boron in the boron-containing LMO is preferably 0.001 to 2.0 mass percent, particularly preferably 0.01 to 0.5 mass percent, and more preferably 0.05 to 0.3 mass percent.

A boron content of not less than 0.001 mass percent enables the specific surface area of manganese dioxide to be effectively reduced, while avoiding increase in water content. By using the manganese dioxide of the present invention as a positive electrode active material for a lithium battery, it is therefore possible to sufficiently reduce the amount of Mn to be eluted when stored in a battery at high temperature. Further, a boron content of not more than 2.0 mass percent enables the battery properties to be preferably maintained.

<Acid Washing>

Next, the boron-containing LMO thus obtained is washed with an acid.

Lithium and boron can be removed by the acid washing.

It is preferable to use an inorganic acid (mineral acid) such as hydrochloric acid, sulfuric acid, or nitric acid for acid washing. In this case, if the boron-containing LMO to be washed consists mainly of spinel, the acid washing enables lithium to be further easily removed to provide a manganese dioxide containing lithium of not more than 1.0 mass percent. At the same time, most of the boron contained in the boron-containing LMO is removed by the acid washing, and the finally obtained manganese dioxide normally contains boron of not more than 0.1 mass percent.

Condition for the acid washing is not particularly limited, as long as lithium can be removed from the boron-containing LMO. It is preferable, for example, the boron-containing LMO is washed with an acid solution of pH 1.8 to 2.5, particularly pH 2.2 to 2.3 so that the lithium content become not more than 1 mass percent, particularly not more than 0.6 mass percent. In a preferred specific example, the boron-containing LMO is immersed in mineral acid of 10 g/L to 100 g/L, for example, sulfuric acid (pH 2.2 to 2.3), while being agitated for about 1 hour, and then washed with water twice or three times.

However, the boron-containing LMO may be filtered without being washed with water after being immersed in mineral acid.

It is preferable that the manganese dioxide washed with an acid is recovered by filtering, dried, subjected to adjustment by disintegration or the like as required so as to have a pre-determined particle size (for example, 1 μm to 100 μm, preferably 5 μm to 50 μm), and then subjected to firing.

The drying at this time is preferably executed at about 100° C. The disintegration may be carried out by using a mortar or the like to lightly disintegrate the compound.

It is known that the acid treatment of $LiMn_2O_4$ results in a $\lambda$ type manganese dioxide as disclosed in U.S. Pat. No. 4,246,253. If the compound resulting from the above acid washing is fired at 200 to 330° C., a manganese dioxide different from the ones disclosed in, for example, Japanese Patent Application Laid-Open Nos. 61-17424, 1-231270, and 2001-273900. Consequently, it is considered that the compound resulting from the acid washing is not a simple $\lambda$ type manganese dioxide.

<Second Firing>

After the above acid washing, a spinel-$\beta$-$\lambda$(-$\gamma$) phase coexisting manganese dioxide can be obtained by firing at 200° C. to 330° C. for 2 hours to 100 hours.

However, the firing condition for obtaining a spinel-$\beta$-$\lambda$(-$\gamma$) phase coexisting manganese dioxide is not limited to those described above. Other firing conditions may be used provided that a spinel-$\beta$-$\lambda$(-$\gamma$) phase coexisting manganese dioxide can be obtained. For example, adjusting firing time with the condition of the firing temperature range between 180° C. and 350° C. has possibility to obtain a spinel-$\beta$-$\lambda$(-$\gamma$) phase coexisting manganese dioxide equivalent to that obtained by firing at 200° C. to 330° C. for 2 to 10 hours.

The firing condition in this case is an extremely important factor for obtaining a spinel-$\beta$-$\lambda$(-$\gamma$) phase coexisting manganese dioxide at this stage, however, this firing condition is not the only determining factor for obtaining a spinel-$\beta$-$\lambda$(-$\gamma$) phase coexisting manganese dioxide. For example, Japanese Patent Application Laid-Open No. 61-17424 discloses a manganese dioxide obtained by firing a $\lambda$ type manganese dioxide at a temperature of 250° C. to 400° C. However, the material to be washed with an acid is a no boron-containing lithium manganese oxide, of which the peak position and intensity ratio of the obtained manganese dioxide are different from those of the spinel-$\beta$-$\lambda$(-$\gamma$) phase coexisting manganese dioxide.

Further, Japanese Patent Application Laid-Open No. 1-231270 discloses a manganese dioxide obtained by firing a $\lambda$ type manganese dioxide at a temperature of 150° C. to 450°

C., however, a different acid washing condition is used and the obtained manganese dioxide has a crystal structure different from that of the spinel-β-λ(-γ) phase coexisting manganese dioxide.

Moreover, Japanese Patent Application Laid-Open Nos. 11-11516 and 2001-273900 disclose a composite oxide obtained by acid-treating a spinel type composite oxide and then heat-treating at a temperature of 200° C. to 400° C. However, since the object of the acid washing conditions and the residual lithium are different, there is a difference such that sufficient performance cannot be obtained when used in a primary battery as is the case with the spinel-β-λ(-γ) phase coexisting manganese dioxide.

<Spinel-β-λ(-γ) Phase Coexisting Manganese Dioxide>

The spinel-β-λ(-γ) phase coexisting manganese dioxide obtained by the above manufacture method not only comprises the aforementioned features but also contains boron of not more than 0.1 mass percent, preferably not more than 0.01 mass percent, and more preferably 0.0001 to 0.01 mass percent.

In the above, a description has been given of a manufacture method for obtaining a spinel-β-λ(-γ) phase coexisting manganese dioxide, characterized by mixing a material manganese dioxide, a lithium salt compound, a boron compound, and a magnesium compound, firing the mixture at 700° C. to 950° C. (first firing) to obtain a boron-containing lithium-manganese composite oxide (hereinafter referred to as a "boron-containing LMO"), washing the boron-containing LMO with an acid, adjusting the particle size of the boron-containing LMO as required, and firing the boron-containing LMO at 200° C. to 330 (second firing). However, a spinel-β-λ(-γ) phase coexisting manganese dioxide is expected to be analogously obtained by using, instead of boron, an oxide having a melting point of not more than 1000° C., preferably not more than 900° C., and particularly preferably not more than 750° C. and exerting a flux effect.

(Applications)

With a spinel-β-λ(-γ) phase coexisting manganese dioxide as a positive electrode active material for a lithium primary battery, a battery excellent in high-temperature storage property can be constructed. In this case, a negative electrode active material is not particularly limited, and a material conventionally known can be used such as lithium or the like as an example. Further, an electrolytic solution is also not particularly limited, and a material conventionally known can be used such as an organic solvent solution of lithium salt or the like as an example.

A lithium primary battery using a spinel-β-λ(-γ) phase coexisting manganese dioxide is excellent in high-temperature storage property. Accordingly, a spinel-β-λ(-γ) phase coexisting manganese dioxide is particularly suitable as a positive electrode active material for a lithium battery used in an environment where temperature reaches, for example, not less than 80° C.

In particular, with the specific surface area of a manganese dioxide of 1 m$^2$/g to 8 m$^2$/g, it further prevents the battery properties from being degraded after storage at high temperature.

Moreover, provided that a manganese dioxide is obtained by subjecting a lithium-manganese composite oxide containing boron to a mineral acid treatment and then firing, a manganese dioxide can be manufactured which constitute a more excellent battery due to its high-temperature storage property when used as a positive electrode active material for a lithium primary battery.

At present, the manganese dioxide of the present invention is particularly suitable for a positive electrode active material for a lithium primary battery. However, as the negative electrode material is further improved, the manganese dioxide of the present invention is expected to be also particularly suitable for a positive electrode active material for a secondary battery, that is, a positive electrode active material for various lithium batteries.

EXAMPLES

Examples 1 to 5

$MnO_2$ (normal electrolytic manganese dioxide) and $Li_2CO_3$ were mixed in a mass ratio of 100:20.2. MgO and $Li_2B_4O_7$ were then added so that the Mg content was 0.2 mass percent and the boron content was 0.01 mass percent with respect to the mixture. The resulting mixture was fired in the air under the conditions shown in Table 1 (first firing) to obtain a lithium-manganese composite oxide containing boron of 0.01 mass percent.

The lithium-manganese composite oxide was washed with $H_2SO_4$ of 100 g/L under the conditions shown in Table 1 (periods of time shown in Table 1 indicate immersion periods), then washed with water, filtered, and dried. The resulting oxide was fired in the air under the conditions shown in Table 1 (second firing) and then disintegrated using a mortar to obtain a manganese dioxide according to Examples 1 to 5 (average particle size: 20 μm).

Examples 6 to 10

$MnO_2$ (normal electrolytic manganese dioxide) and $Li_2CO_3$ were mixed in a mass ratio of 100:20.2. $Li_2B_4O_7$ was then added so that the boron content was 0.01 mass percent with respect to the mixture. The resulting mixture was fired in the air under the conditions shown in Table 1 (first firing) to obtain a lithium-manganese composite oxide containing boron of 0.01 mass percent.

The lithium-manganese composite oxide was washed with 100 g/L of $H_2SO_4$ under the conditions shown in Table 1 (periods of time shown in Table 1 indicate immersion periods), then washed with water, filtered, and dried. The resulting oxide was fired in the air under the conditions shown in Table 1 (second firing) and then disintegrated using a mortar to obtain a manganese dioxide according to Examples 6 to 10 (average particle size: 20 μm).

Comparative Example 1

As Comparative Example 1, an electrolytic manganese dioxide similar to that used as an Mn material in Examples 1 to 10 was fired under the conditions shown in Table 1, and disintegrated using a mortar to obtain a manganese dioxide (average particle size: 20 μm).

Comparative Examples 2 and 3

$MnO_2$ (normal electrolytic manganese dioxide) and $Li_2CO_3$ were mixed together beforehand so that Li/Mn=1/2 (atomic ratio), and then fired in the air at 750° C. to obtain lithium manganese spinel (chemical formula: $LiMn_2O_4$). The lithium manganese spinel was then washed with 100 g/L of $H_2SO_4$ under the conditions shown in Table 1 (periods of time shown in Table 1 indicate immersion periods), then washed with water, filtered, and dried. The resulting spinel was fired in the air under the conditions shown in Table 1 (second firing), and then disintegrated using a mortar to obtain a manganese dioxide according to Comparative Examples 2 and 3 (average particle size: 20 μm).

These operations were all performed in a dry box under argon atmosphere. An electrolytic solution was obtained by dissolving 1 mole/L of lithium perchlorate to a 1:1 mixed

TABLE 1

|  | | First firing | Acid washing | | | Second firing | | |
| --- | --- | --- | --- | --- | --- | --- | --- | --- |
|  | Additive | Firing temperature | Acid concentration PH | Temperature | Time | Firing temperature | Retention time | Cooling speed |
| Example 1 | Mg + B | 750 | 2.2 | 25 | 2 | 200 | 1 | 50 |
| Example 2 | Mg + B | 750 | 2.2 | 40 | 2 | 250 | 2 | 50 |
| Example 3 | Mg + B | 750 | 2.2 | 60 | 2 | 250 | 10 | 50 |
| Example 4 | Mg + B | 550 | 2.2 | 40 | 0.5 | 300 | 1 | 100 |
| Example 5 | Mg + B | 750 | 2.2 | 60 | 0.1 | 330 | 1 | 50 |
| Example 6 | B | 750 | 2.2 | 25 | 2 | 200 | 1 | 50 |
| Example 7 | B | 750 | 2.2 | 40 | 2 | 250 | 2 | 50 |
| Example 8 | B | 750 | 2.2 | 60 | 2 | 250 | 10 | 50 |
| Example 9 | B | 550 | 2.2 | 40 | 0.5 | 300 | 1 | 100 |
| Example 10 | B | 750 | 2.2 | 60 | 0.1 | 330 | 1 | 50 |
| Comparative Example 1 | | | | | | 400 | 2 | 50 |
| Comparative Example 2 | | | 2.2 | 25 | 2 | 250 | 2 | 50 |
| Comparative Example 3 | | | 2.2 | 25 | 2 | 400 | 2 | 50 |

<Lithium Content>

The lithium contents in the manganese dioxides obtained in Examples 1 to 10 and Comparative Examples 1 to 3 were measured by ICP emission spectroscopy. The measurement results are shown in Table 2.

(X-Ray Diffraction)

The Manganese Dioxides Obtained in Examples 1 to 10 and Comparative Examples 1 to 3 were subjected to X-ray diffraction measurement to obtain X-ray diffraction patterns. Table 2 shows peak intensities (peak heights) as peak intensity ratio of characteristic peaks of the obtained X-ray diffraction patterns, by taking the peak intensity at $2\theta=37.3°\pm0.5°$ as 100.

Figure 2:
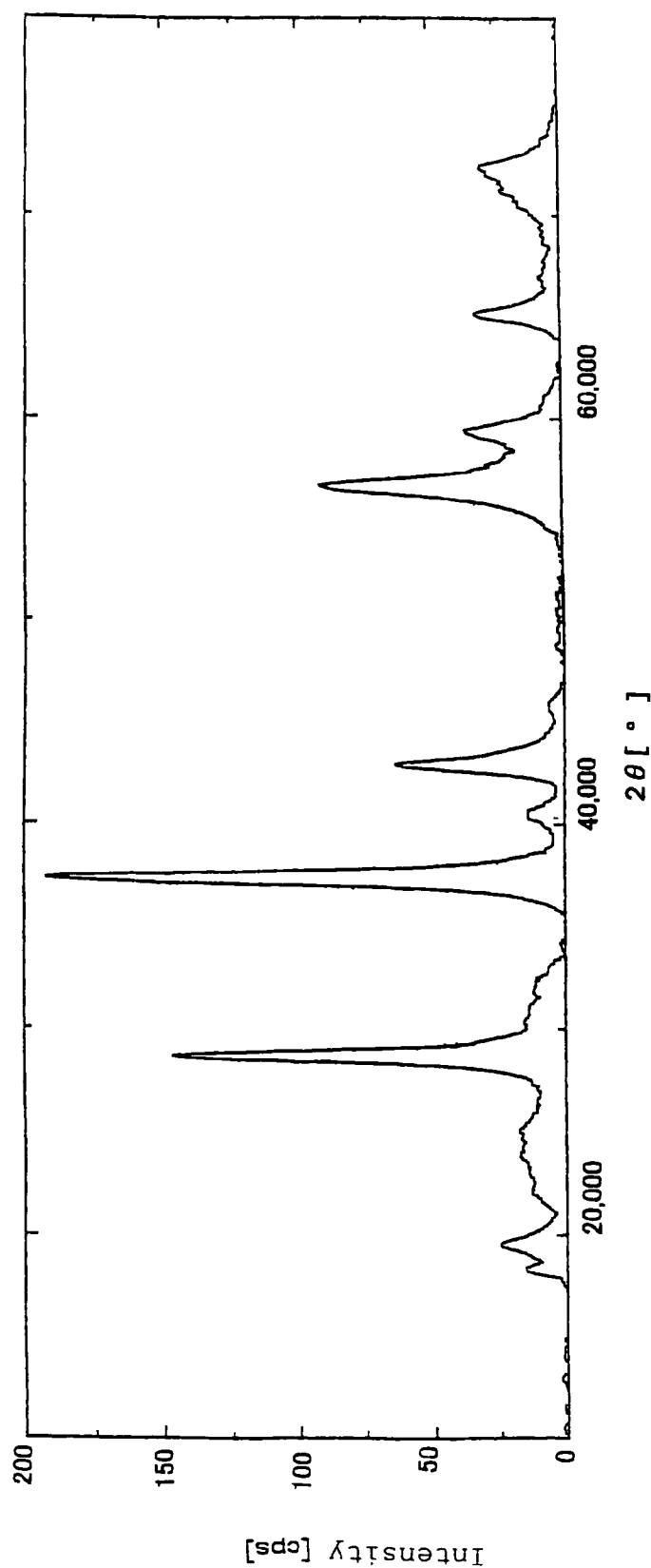
FIG. 2 is an X-ray diffraction pattern (chart) obtained in Example 4.
Figure 3:
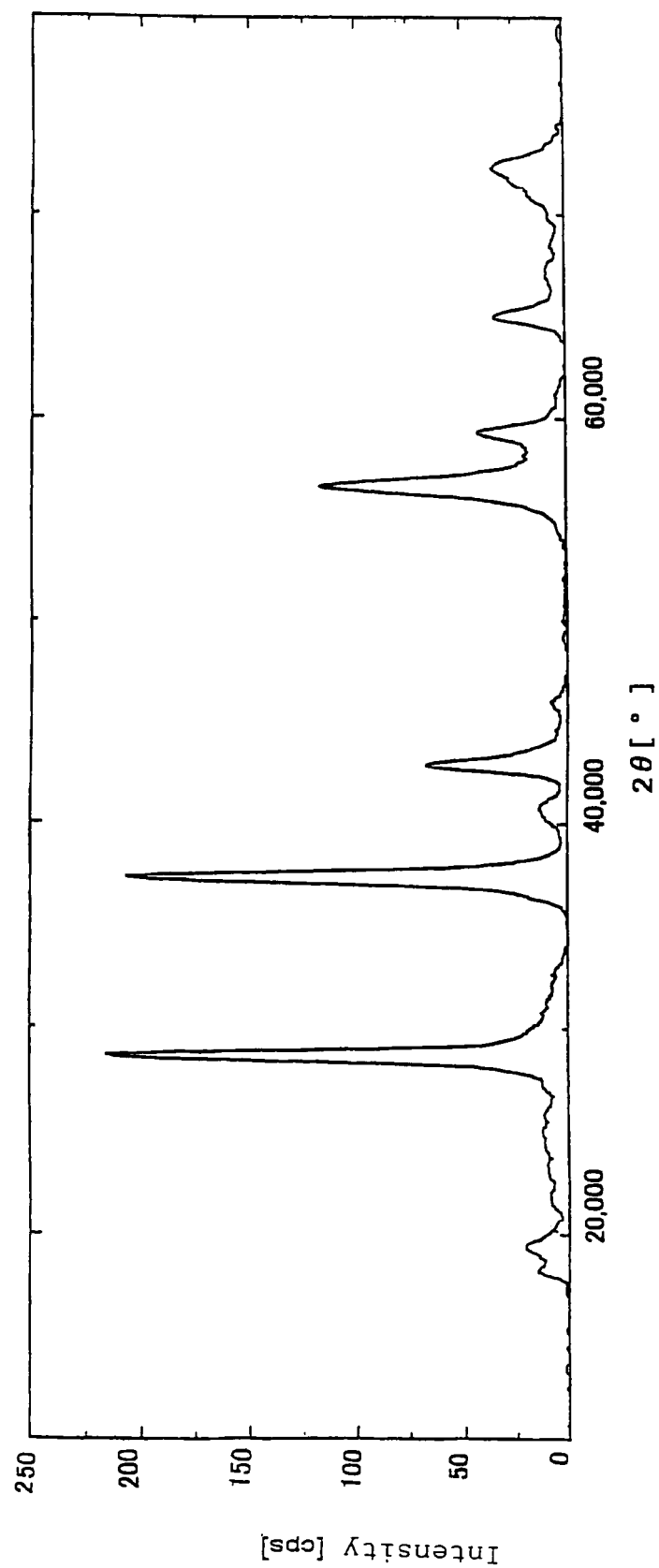
FIG. 3 is an X-ray diffraction pattern (chart) obtained in Example 5.

FIGS. 1, 2, and 3 show the X-ray diffraction patterns (charts) obtained in Examples 2, 4, and 5, as typical examples. For the X-ray diffraction measurement, a sample was measured using an X-ray diffraction analyzer (RINT2200V manufactured by Rigaku Corporation), a CuKα tube, and a graphite monochromator under the conditions of 40 kV tube voltage, 40 mA tube current, 0.5 degree divergence slit, 0.5 degree scatter slit, 0.15 mm receiving slit, 1.00 deg/min scan speed, 0.020 degree sampling pitch, and 10.000° to 80.000° scanning range.

<Battery Evaluation and Discharge Performance Test>

0.135 g of each of the manganese dioxides obtained in Examples 1 to 10 and Comparative Examples 1 to 3 was weighed out and 0.09 g of graphite and 0.06 g of tetrafluoroethylene resin were added to each manganese dioxide. The mixture was then molded under a pressure of 3 t/cm² to prepare a positive electrode. Pre-dried manganese dioxide, graphite, and tetrafluoroethylene resin were used.

Figure 4:
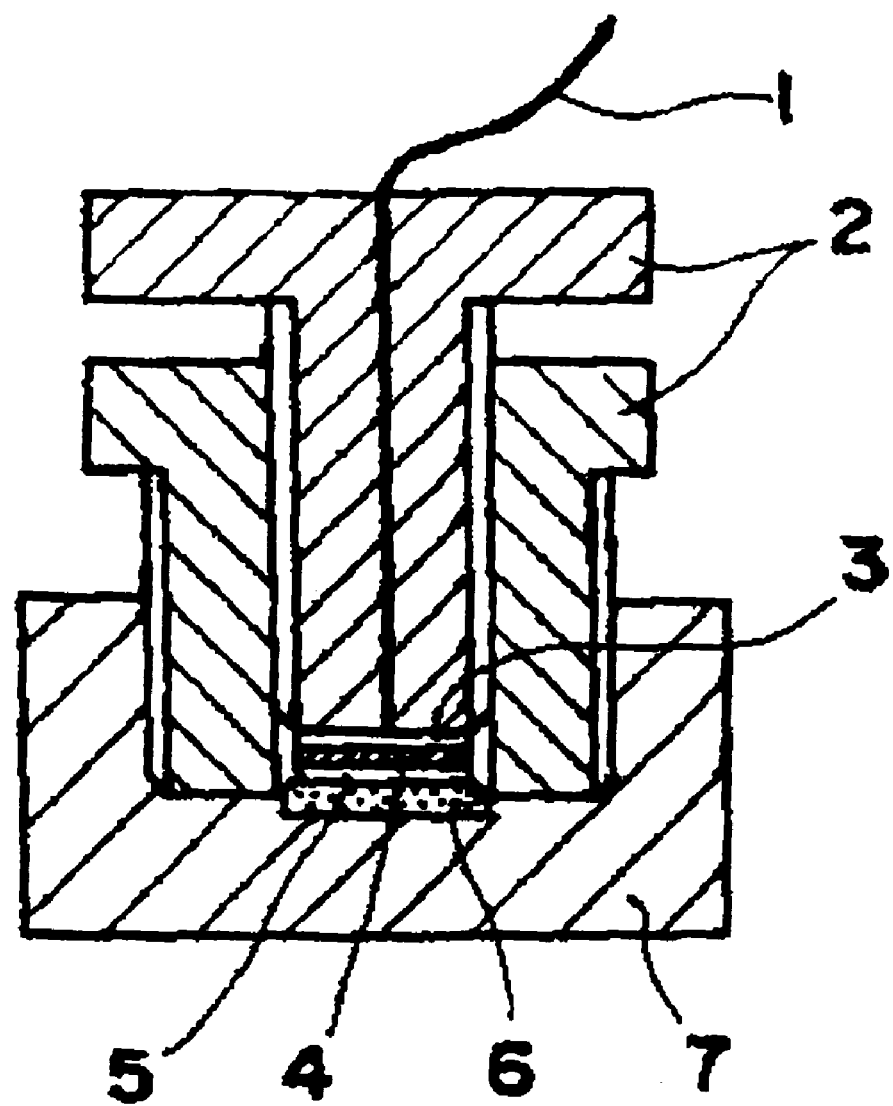
FIG. 4 is a sectional view of a test cell produced for battery evaluations.

The obtained positive electrode was used to produce a test cell as shown in FIG. 4. Continuous discharge current density of 1 mA/cm² was carried out on the basis of the area of the positive electrode at a room temperature of 20° C. The discharge duration was measured until end of discharge voltage of 2.5 V was reached. Table 3 shows the measurement result as relative values with respect to the discharge duration in Comparative Example 1 taken as 100.

solvent of propylecarbonate and 1,2-dimethoxyethane. The reagent used in this case had been dried by a conventional method. A sheet of metal lithium was used as a negative electrode by punching so that the resulting shape had the same diameter as that of the positive electrode.

In the test cell shown in FIG. 4, reference numeral 1 denotes a negative terminal for allowing a current to be externally available. Reference numeral 2 denotes insulators made of Teflon resin which are each threaded so as to seal the cell. Moreover, reference numeral 3 denotes a negative plate and reference numeral 4 denotes a sheet of metal lithium negative electrode which is pressure bonding to negative plate. Reference numerals 5, 6, and 7 denote a separator made of nonwoven cloth, a positive electrode produced as described above, a positive electrode terminal made of stainless steel, respectively.

<Manganese Elution Amount>

The manganese dioxides obtained in Examples 1 to 10 and Comparative Examples 1 to 3 were immersed in an electrolytic solution for model batteries and held at 80° C. for 10 days. Then, the amount of manganese in the electrolytic solution was analyzed by ICP emission spectrometry to measure the amount of manganese eluted. Table 3 shows the measurement result as relative values by taking the manganese elution amount in Comparative Example 1 as 100.2 g of the sample was weighed out, 5 mL of electrolytic solution was injected into a polyvinyl container, and the sample was immersed in the container. The container was stoppered tightly and stored in a constant-temperature device maintained at 80° C. The electrolytic solution was obtained by dissolving 1 mole/L of lithium perchlorate to a 1:1 mixed solvent of propylecarbonate and 1,2-dimethoxyethane.

During storage, when manganese in the manganese dioxide elutes into the electrolytic solution, the eluted manganese deposits in and blocks the separator. This increases the internal resistance of the battery to degrade battery performance. Accordingly, the manganese elution amount is an index for evaluating a storage property.

TABLE 2

| | Li amount Li | | 18 | 19 | 22 | 28 | 37 | 56 | 59 | 65 |
|---|---|---|---|---|---|---|---|---|---|---|
| Example 1 | 0.6 | Peak intensity ratio | 12 | 20 | 11 | 64 | 100 | 44 | 18 | 17 |
| Example 2 | 0.5 | | 27 | 28 | 14 | 47 | 100 | 43 | 20 | 22 |
| Example 3 | 0.4 | | 25 | 20 | 11 | 47 | 100 | 43 | 19 | 22 |
| Example 4 | 0.4 | | 10 | 12 | <10 | 76 | 100 | 43 | 19 | 17 |
| Example 5 | 0.4 | | 25 | 20 | <10 | 104 | 100 | 46 | 19 | 16 |
| Example 6 | 0.6 | | 13 | 18 | 12 | 48 | 100 | 46 | 19 | 15 |
| Example 7 | 0.5 | | 14 | 13 | 15 | 53 | 100 | 43 | 19 | 17 |
| Example 8 | 0.4 | | 25 | 20 | 15 | 53 | 100 | 43 | 19 | 17 |
| Example 9 | 0.4 | | 11 | 20 | <10 | 70 | 100 | 43 | 19 | 18 |
| Example 10 | 0.4 | | 13 | 20 | <10 | 114 | 100 | 43 | 19 | 14 |
| Comparative Example 1 | <0.01 | | <10 | <10 | <10 | 147 | 100 | 55 | 20 | 14 |
| Comparative Example 2 | 0.3 | | <10 | 79 | <10 | <10 | 100 | 23 | <10 | 20 |
| Comparative Example 3 | 0.3 | | <10 | <10 | <10 | 102 | 100 | 55 | 20 | 14 |

TABLE 3

| | Discharge duration | Mn elution amount |
|---|---|---|
| Example 1 | 110 | 41 |
| Example 2 | 115 | 38 |
| Example 3 | 113 | 35 |
| Example 4 | 110 | 35 |
| Example 5 | 110 | 30 |
| Example 6 | 114 | 39 |
| Example 7 | 115 | 38 |
| Example 8 | 113 | 36 |
| Example 9 | 110 | 35 |
| Example 10 | 105 | 30 |
| Comparative Example 1 | 100 | 100 |
| Comparative Example 2 | 56 | 180 |
| Comparative Example 3 | 95 | 40 |

0.135 g of each of the manganese dioxides obtained in Example 2 and Comparative Example 1 was weighed out. 0.09 g of graphite and 0.06 g of tetrafluoroethylene resin were added to each manganese dioxide. The mixture was then molded under a pressure of 3 t/cm$^2$ to prepare a positive electrode. Pre-dried manganese dioxide, graphite, and tetrafluoroethylene resin were used.

Figure 5:
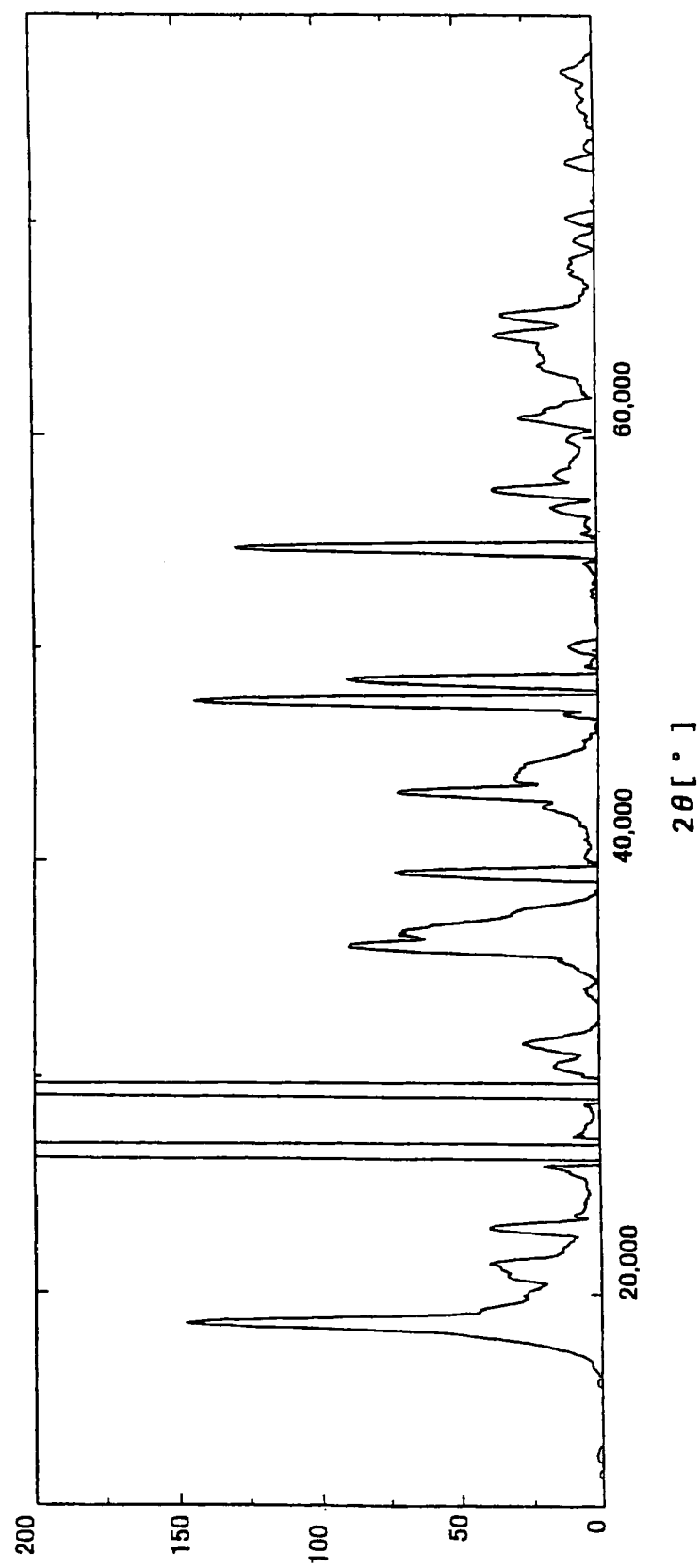
FIG. 5 is an X-ray diffraction pattern (chart) of a fired manganese dioxide obtained in Example 2, the pattern resulting from discharge using a test cell produced from the manganese dioxide.
Figure 6:
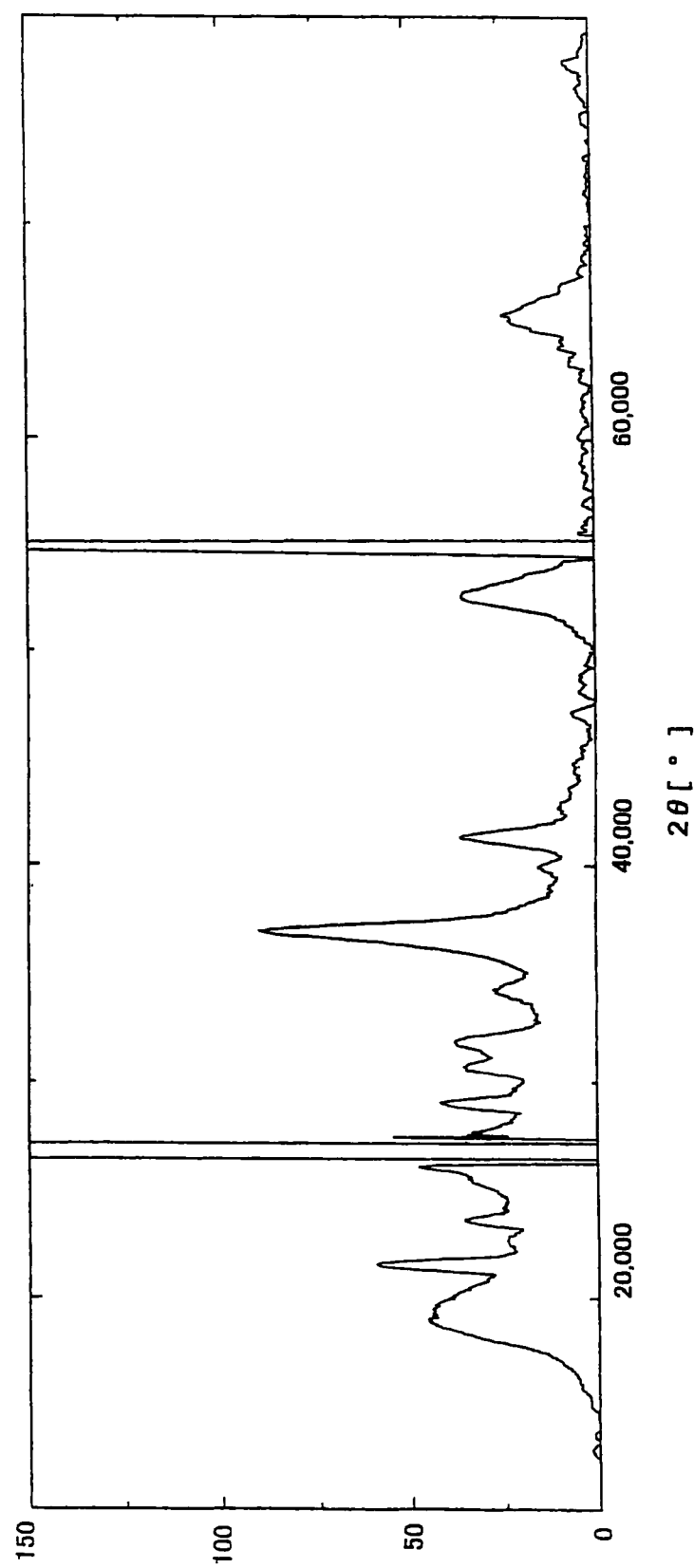
FIG. 6 is an X-ray diffraction pattern (chart) of a manganese dioxide obtained in Comparative Example 1, the pattern resulting from discharge using a test cell produced from the manganese dioxide.

The obtained positive electrode was used to produce a test cell as similarly shown in FIG. 4 (Example 2A and Comparative Example 1A). The test cell was discharged down to a cut voltage of 1.0 V at a constant resistance of 2.5 kΩ at 20° C. The test cell was then disintegrated to recover the manganese dioxide, which was then subjected to X-ray diffraction measurements. FIGS. 5 and 6 show X-ray diffraction patterns (charts) obtained.

In the result, the manganese dioxide after the discharge exhibited the peak present at the position of 2θ=19.5°±0.5° had a peak intensity ratio of not less than 1.0 with respect to the peak at 2θ=37.3°±0.5°.

The invention claimed is:

1. A positive electrode active material for a lithium battery which comprises manganese dioxide having a crystal structure that exhibits an X-ray diffraction pattern in which peaks having a peak intensity ratio of not less than 0.05 with respect to the peak at 2θ=37.3°±0.5° are present at positions of 2θ=18.2°±0.5°, 19.5°±0.5°, 28.6°±0.5°, 56.6°±0.5°, 59.1°±0.5°, and 65.1°±0.5°, the X-ray diffraction pattern being obtained using a powder X-ray diffraction device (XRD) that uses CuKα1 rays,
wherein the manganese dioxide is spinel-β-λ phase coexisting manganese dioxide, and
the amount of lithium element in the manganese dioxide is 0.3 to 1.0 mass %.

2. A positive electrode active material for a lithium battery which comprises manganese dioxide having a crystal structure that exhibits an X-ray diffraction pattern in which peaks having a peak intensity ratio of not less than 0.05 with respect to a peak at 2θ=37.3°±0.5° are present at positions of 2θ=18.2°±0.5°, 19.5°±0.5°, 22.0°±1.0°, 28.6°±0.5°, 56.6°±0.5°, 59.1°±0.5°, and 65.1°±0.5°, the X-ray diffraction pattern being obtained using a powder X-ray diffraction device (XRD) that uses CuKα1 rays,
wherein the manganese dioxide is spinel-β-λ-γ phase coexisting manganese dioxide.

3. The positive electrode active material for a lithium battery according to claim 1, wherein the peak present at the position of 28.6°±0.5° has a peak intensity ratio of not less than 0.3 with respect to the peak at 2θ=37.3°±0.5°.

4. The positive electrode active material for a lithium battery according to claim 1, wherein the peak present at the position of 28.6°±0.5° has a peak intensity ratio of not less than 0.3 with respect to the peak at 2θ=37.3°±0.5°, and the full width at half maximum of the peak is not more than 1.0°.

5. The positive electrode active material for a lithium battery according to claim 1 wherein the angular difference between the peak present at the position of 56.6°±0.5% and the peak present at the position of 59.1°±0.5° is not less than 2°.

6. The positive electrode active material for a lithium battery according to claim 1 wherein peak intensity ratio of the peak present at the position of 65.1°±0.5° with respect to the peak at 2θ=37.3°±0.5° is not less than 0.10, and the full width at half maximum of the peak is not more than 1.0°.

7. The positive electrode active material for a lithium battery according to claim 1 wherein the manganese dioxide comprises boron in an amount of from 0.0001 to 0.01 mass percent.

8. The positive electrode active material for a lithium battery according to claim 1 wherein, the manganese dioxide has a crystal structure exhibiting an X-ray diffraction pattern in which the peak intensity ratio of the peak present at the position of 2θ=19.5°±0.5° with respect to the peak at 2θ=37.3°±0.5° is not less than 1.0, the X-ray diffraction pattern being measured by an X-ray diffraction device (XRD) that uses CuKα1 rays after the positive electrode active material has been subjected to a discharge down to a cut voltage of 1.0V at a constant resistance of 2.5KΩ at 20° C.

9. The positive electrode active material for a lithium battery according to claim 1 wherein the positive-electrode active material is used for a lithium battery in the environment where temperature reaches 80° C. or higher.

* * * * *